United States Patent [19]
Schmidt

[11] 3,967,907
[45] July 6, 1976

[54] BALL SOCKET FOR BALL JOINT

[75] Inventor: Andreas Schmidt, Meerbusch, Germany

[73] Assignee: A. Ehrenreich & Cie., Dusseldorf-Oberkassel, Germany

[22] Filed: July 2, 1975

[21] Appl. No.: 592,363

[30] Foreign Application Priority Data
July 18, 1974 Germany............................ 2434490

[52] U.S. Cl.................................. 403/133; 403/39; 403/125; 403/140
[51] Int. Cl.² ...................... F16C 11/00; F16D 1/12
[58] Field of Search ................. 403/38, 39, 40, 124, 403/125, 126, 132, 133, 135, 140, 220, 221, 225; 308/72, 108, 240

[56] References Cited
UNITED STATES PATENTS

| | | | |
|---|---|---|---|
| 2,932,534 | 4/1960 | Williams | 403/140 |
| 2,952,486 | 9/1960 | Reuter et al. | 403/40 |
| 3,114,569 | 12/1963 | Carlson | 403/125 X |
| 3,211,483 | 10/1965 | Sullivan | 403/140 |
| 3,233,929 | 2/1966 | Herbenar | 403/140 |
| 3,337,246 | 8/1967 | Moskovitz | 403/135 X |
| 3,374,016 | 3/1968 | Melton et al. | 403/125 |
| 3,411,815 | 11/1968 | Sullivan | 403/140 X |
| 3,445,131 | 5/1969 | Gottschald | 403/140 |
| 3,647,249 | 3/1972 | Baba et al. | 403/140 |
| 3,695,651 | 10/1972 | Stuck | 403/140 |

FOREIGN PATENTS OR APPLICATIONS
712,337 6/1965 Canada............................ 403/132

Primary Examiner—Werner H. Schroeder
Assistant Examiner—Wayne L. Shedd
Attorney, Agent, or Firm—Ernest F. Marmorek

[57] ABSTRACT

A plastic ball socket for a grease lubricated ball joint socket, having a hemispherical inner cup composed of thin, hard, elastic material; an outer cup composed of soft elastic material at least partially containing the inner cup and having elongated ribs disposed on the outer surface of the outer cup to support the outer cup in the ball joint socket, spaced apart from the ball joint socket whereby the plastic ball socket may be deformed during use to form grease lubrication grooves between it and an inserted ball.

4 Claims, 4 Drawing Figures

BALL SOCKET FOR BALL JOINT

BACKGROUND OF THE INVENTION

The instant invention relates to a plastic ball socket for a grease lubricated ball joint which socket is formed of two sections, an inner hemispherical interior cup and an outer cup, such as those disclosed in U.S. Pat. No. 3,647,249 and British Pat. No. 629,906. Such ball joints find much use in the automotive industry as steering tie rod joints and wheel suspension joints. It is common to find such ball joints having a synthetic material socket having a closed sealing sack and a permanent grease packing. Such joints have the advantage of not requiring regular servicing but have a main drawback in that during use, the wear and tear on the joint results in abrasive pieces being mixed with the grease. This results in a reduction in the lubricating properties of the grease which in turn accelerates the wear and tear on the parts and soon the joint becomes unusable.

In known ball sockets, slots or grooves are cut into the socket as channels for lubricants for the joint. The upper edges of these grease slots or grooves, although they are usually rounded, in practice often act to strip the lubrication from the spherical surface of the ball which the ball joint socket is supporting. This contributes further to the wear and tear of the ball joint unit during use and therefore decreases the useful life of the ball joint.

Multi-level or composite sliding bearings are known, for instance the Mackensen bearing, wherein grease is carried in a greasing slot or groove in the form of an elongated pocket formed by elastic deformation of a respective thin walled bushing. Such a device requires a peripheral velocity for the bearings in order to form the furrows or pockets which act as the grease slots or grooves. As there is usually no appreciable circumferential velocity associated with ball joints of the type intended for use with the instant invention, the required peripheral velocity to permit lubrication using a Mackensen type bearing, is absent.

SUMMARY OF THE INVENTION

It is a principal object of the instant invention to provide grease slots or grooves in the form of elongated pockets or furrows which have a greatly reduced or effectively eliminated tendency to strip the lubrication from a ball supported in a plastic ball socket.

Other objects of the invention will in part be obvious and will in part appear hereinafter.

With the above and other objects of the invention in view, the invention consists in the novel construction, arrangement and combination of elements and parts, as set forth in the claims hereof, one embodiment of the same being illustrated in the accompanying drawings and described in the specification.

The invention accordingly comprises the features of construction, combination of elements and arrangement of parts which will be exemplified in a construction hereinafter set forth and the scope of the application of which will be indicated in the claims.

The objects of the instant invention are attained essentially by using a thin interior cup made of relatively hard, though elastic plastic material but having no preformed grease slots or grooves formed therein. This inner cup is contained in an outer cup of usually softer elastic material, which outer cup conforms at least in part to the inner cup and thereby supports the inner cup. On the outer surface of the outer cup there are disposed elongated ribs. These ribs act to support the outer cup within the ball joint socket but spaced away from the ball joint socket. As the outer cup is supported in the socket only by the elongated ribs, the unsupported regions of this cup may be easily deformed as a result of changing pressures caused by the bearing surface of the ball inserted into the ball joint socket, during use. The deformation of the outer cup results in similar deformations in the inner cup being supported by the outer cup. This forms pockets in the region between the inner cup and the ball bearing surface which pockets act as grease slots or grooves spaced essentially between the regions supported directly by the ribs. The walls of these pockets have very gradual slopes away from the bearing surface of the ball. Thus, the tendency to strip lubrication from the bearing surface of the ball is greatly reduced or essentially eliminated.

BRIEF DESCRIPTION OF THE DRAWINGS

For a fuller understanding of the nature and objects of the invention, reference should be had to the following detailed description, taken in connection with the accompanying drawings, in which.

DESCRIPTION OF THE PREFERRED EMBODIMENTS

Figure 1:
FIG. 1 is a sectional view of the plastic ball socket according to the instant invention.
Figure 2:
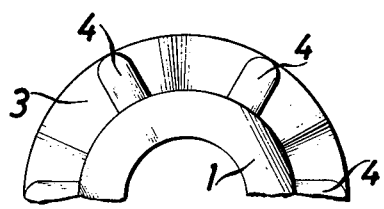
FIG. 2 is an elevational view of the plastic ball socket as shown in FIG. 1, showing the elongated ribs.
Figure 3:
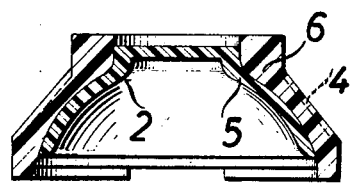
FIG. 3 is a sectional view of the plastic ball socket supported within the ball joint socket.

In carrying the invention into effect in one of the embodiments which has been selected for illustration in the accompanying drawings and for description in the specification, and referring now particularly to FIG. 3, a thin inner cup 5 made of hard, elastic, plastic material and having no greasing slots or grooves preformed on its inner spherical slide surface 2 is supported by an outer cup 6 made of a plastic material. The outer cup 6 has, disposed on its outer surface, elongated ribs 4. As shown in FIG. 2, these ribs are spaced apart and preferably radially extend over most of the length of the outer cup corresponding to that portion of the outer cup which supports the inner cup.

Figure 4:
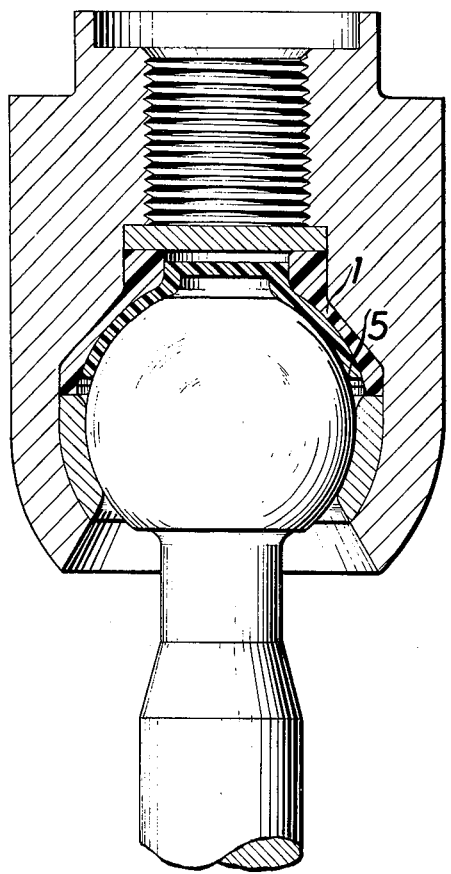
FIG. 4 is a sectional view of the complete ball joint unit showing the ball inserted in the complete ball joint socket.

When inserted into the ball joint socket as shown in FIG. 4, the plastic ball socket is supported spaced slightly away from the ball joint socket by the ribs 4. The ball shown inserted in the ball joint socket as in FIG. 4, will cause wrinkles or elongated pockets to form in the plastic ball socket, which elongated pockets act as grease slots or grooves having sides with practically no transition into the regions of the bearing plane. The diminishingly small transition facilitates and improves lubrication, at a comparatively small production cost, while eliminating the problems of striping away of lubrication from the ball surface due to the prior art embodiments of the grease slot or groove normally employed.

The completed ball joint shown in FIG. 4 is, in general, the type of arrangement generally used in a gear rack or rack and pinion type steering arrangement.

Synthetic polymers such as the polyacetates have been found as suitable material from which the plastic ball sockets may be fabricated.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. A plastic ball socket for a grease lubricated ball joint socket into which a ball is to be inserted, comprising:
    a hemispherical inner cup composed of thin hard, elastic material and having an internal surface adapted at least partially to engage the ball and having an external surface;
    an outer cup composed of soft elastic material with an inner surface at least partially conforming to and supporting the external surface of said inner cup; and
    elongated rib means disposed on an outer surface of said outer cup and being operable to support said outer cup in said ball joint socket spaced apart from said ball joint socket, whereby said plastic ball socket may be deformed during use to form grease lubrication grooves between said internal surface and the ball.

2. A plastic ball socket as claimed in claim 1, wherein said inner cup is composed of a synthetic polymer.

3. A plastic ball socket as claimed in claim 1, wherein said outer cup is composed of a synthetic polyer.

4. A plastic ball socket as claimed in claim 1, wherein said cups are composed of polyacetates.

* * * * *